(12) United States Patent
Behrend et al.

(10) Patent No.: US 7,873,674 B2
(45) Date of Patent: Jan. 18, 2011

(54) PLURAL/ALTERNATE FILES REGISTRY CREATION AND MANAGEMENT

(75) Inventors: George G. Behrend, New York, NY (US); Christopher V. DeRobertis, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 11/334,209

(22) Filed: Jan. 18, 2006

(65) Prior Publication Data

US 2007/0174345 A1    Jul. 26, 2007

(51) Int. Cl.
*G06F 7/00* (2006.01)
*G06F 17/30* (2006.01)

(52) U.S. Cl. ........................ 707/803; 707/966
(58) Field of Classification Search ........................ None
See application file for complete search history.

(56) References Cited

U.S. PATENT DOCUMENTS

| | | | |
|---|---|---|---|
| 5,941,947 A * | 8/1999 | Brown et al. ................. | 709/225 |
| 5,978,813 A | 11/1999 | Foltz et al. | |
| 6,029,175 A * | 2/2000 | Chow et al. ............... | 707/104.1 |
| 6,070,190 A | 5/2000 | Reps et al. | |
| 6,088,451 A * | 7/2000 | He et al. ........................ | 726/8 |
| 6,157,953 A | 12/2000 | Chang et al. | |
| 6,708,170 B1 | 3/2004 | Byrne et al. | |
| 7,269,646 B2 * | 9/2007 | Yamamoto et al. .......... | 709/223 |
| 2003/0018696 A1 | 1/2003 | Sanchez, II et al. | |
| 2003/0033379 A1 | 2/2003 | Civanlar et al. | |
| 2005/0010485 A1 | 1/2005 | Sarvestani et al. | |
| 2007/0100929 A1 * | 5/2007 | DeRobertis et al. ......... | 709/200 |

OTHER PUBLICATIONS

Harris et al., The Design and Implementation of a Network Account Management System, 1996, Proceedings of the Tenth USENIX System Administration Conference, p. 33-42.*
Thomas et al., UNIX Host Administration in a Heterogeneous Distributed Computing Environment, 1996, Proceedings of the Tenth USENIX System Administration Conference, pp. 43-50.*
Radtke, Stefan, "System Authentication for AIX and Linux using the IBM Directory Server," IBM Technique Paper, 2002.*
Celikkan, Ufuk, "Configuring AIX 5L for Kerberos Based Authentication Using Windows Kerberos Service," IBM Corporation, 2006.*

* cited by examiner

*Primary Examiner*—Kuen S Lu
*Assistant Examiner*—Rachel J Lee
(74) *Attorney, Agent, or Firm*—Scully, Scott, Murphy & Presser, P.C.; Steven L. Bennett, Esq.

(57) ABSTRACT

Disclosed are a method of and system for managing plural files registries, for use with a computer operating system having a user/group management operation. The method comprises the steps of creating a plurality of files registries, and providing an administrator with access to each of said plurality of files registries independent of all of the others of said plurality of file registries. Preferably, this is done by inserting, for each of said plurality of files registries, a respective one instruction into the user/group management operation specifying a base directory path to said each of said plurality of files registries.

2 Claims, 2 Drawing Sheets

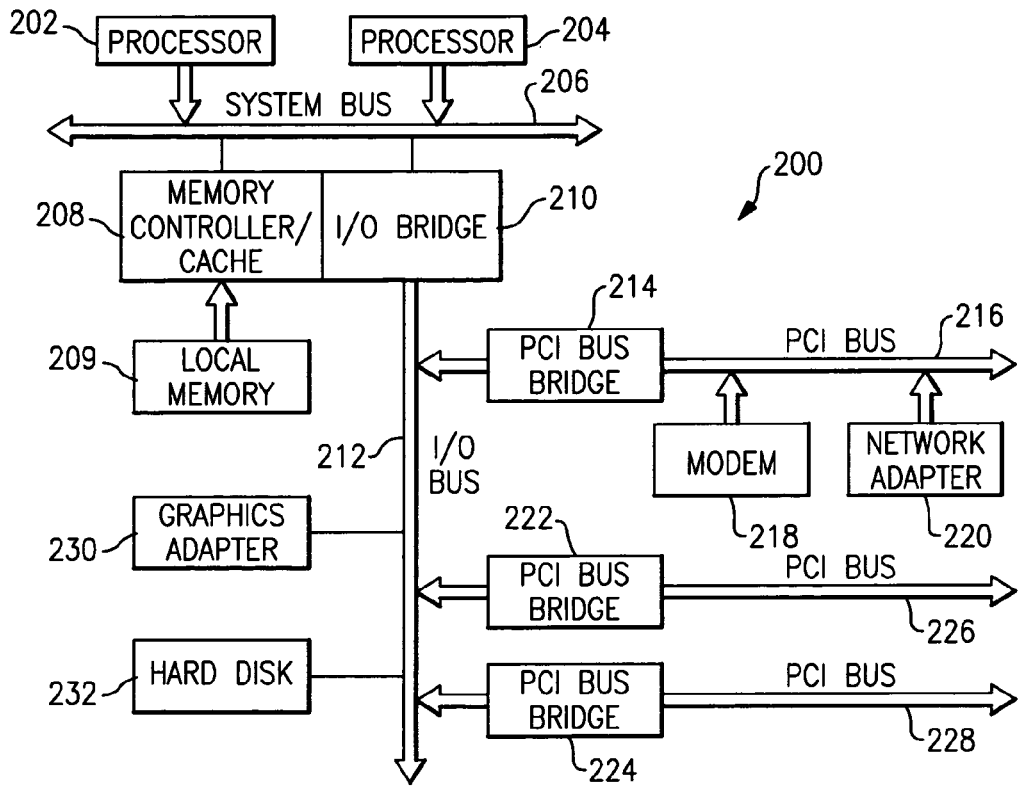

FIG.2 mkuser -b/filesregistry/adminhosts/ id=9845 logintimes=0!0001-2359 testid22

FIG.3

/filesregistry/adminhosts/etc/passwd
/filesregistry/adminhosts/etc/opasswd
/filesregistry/adminhosts/etc/group
/filesregistry/adminhosts/etc/ogroup
/filesregistry/adminhosts/etc/security/passwd
/filesregistry/adminhosts/etc/security/opasswd
/filesregistry/adminhosts/etc/security/user
/filesregistry/adminhosts/etc/security/limits
/filesregistry/adminhosts/etc/security/olimits

FIG.4

PLURAL/ALTERNATE FILES REGISTRY CREATION AND MANAGEMENT

BACKGROUND OF THE INVENTION

1. Field of the Invention

This invention generally relates to files registry in multiple computer systems. More specifically, the invention relates to files registry creation and management.

2. Background Art

User/group management operations in many operating systems, such as AIX and other flavors of UNIX and Linux, commonly used on multiple computer systems do not allow on a single host the creation and management of plural (or alternate) user/group data files, commonly referred to as the files registry (also referred to as the user data repository). The files registry includes files containing the user names, user ids, group names, group ids, user passwords, and other per-user attribute data (like account_locked), as found in the files /etc/passwd, /etc/security/passwd, /etc/group, /etc/security/group, and /etc/security/user on AIX.

Existing files registry user management tasks, including making users/groups, deleting users/groups, password management, and changing attributes of users/groups, impose changes to a single set of files, which are global to a host, thus precluding the administrator from establishing plural or multiple sets of files registry that can be tailored and distributed to different sets (or types) of node groups within a cluster.

If an administrator wants a different files registry on one or more nodes, then the administrator can: (1) manage the files registry on per-host basis; (2) define "master" files registry hosts, manage the files registry on each master host, and then distribute each master files registry to other hosts; or (3) maintain user/group data in a separate, centralized data base, push out to each host on a per-host basis the data that fits the host's user policy profile, and then "assemble" the data as the local files registry. Each option is time consuming, cumbersome, requires administrator intervention in some cases, is prone to synchronization errors, does not provide a seamless administrative user management experience, and is difficult to audit/track.

In the case of the second option, the files registry on each master host still must be distributed to all other nodes of similar type (i.e., the files registry on the master login node still has to be distributed to all other login nodes, and so forth.). Also, with this option, the files registry on each master host could be stored in a mountable file system and then mounted by other nodes. Unfortunately, if the mount operation fails, there is no files registry and user access to a host is not permitted. In the case of the third of the above-identified options, custom scripts are required, separate data input/maintenance of the database is required, and host-profiles must be established.

SUMMARY OF THE INVENTION

An object of this invention is to enable an administrator of a computer cluster to establish plural of multiple sets of files registry that can be tailored and distributed to different sets or types of node groups within a computer cluster.

Another object of the present invention is to enable a single host in a computer cluster to contain multiple sets of files registry data, all created, managed and maintained from a single point of administration.

A further object of the invention is to establish a common switch/flag/directive within existing user/group management commands that instructs the management operation to make modifications to files registry starting at a specified location.

These and other objectives are attained with a method of and system for managing plural files registries, for use with a computer operating system having a user/group management operation. The method comprises the steps of creating a plurality of files registries, and providing an administrator with access to each of said plurality of files registries independent of all of the others of said plurality of file registries. Preferably, this is done by inserting, for each of said plurality of files registries, a respective one instruction into the user/group management operation specifying a base directory path to said each of said plurality of files registries.

In a preferred embodiment of the invention, described below in detail, user/group management interfaces support a new option that allows the administrator to specify a base directory (path) that tells user/group management operations the starting point for the files registry that is the target of the modifications. Thus, a single host could contain multiple sets of files registry data, all created, managed, and maintained from a single point of administration. An administrator can then distribute each files registry set from one host to other hosts in a computer cluster. Each files registry set can contain data that is largely the same, mostly the same, only somewhat the same, or entirely unique per files registry set. (Including, but not limited to, administrator ids, user ids, service/daemon ids, application ids, one-time use ids, restricted use ids, etc.)

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 is an exemplary diagram showing a distributed data processing system that may be used in the present invention.

FIG. 3 shows an example command that may be used in the implementation of this invention.

FIG. 4 lists a set of files that may be included in a files registry created using the present invention.

DETAILED DESCRIPTION OF THE PREFERRED EMBODIMENTS

Figure 1:
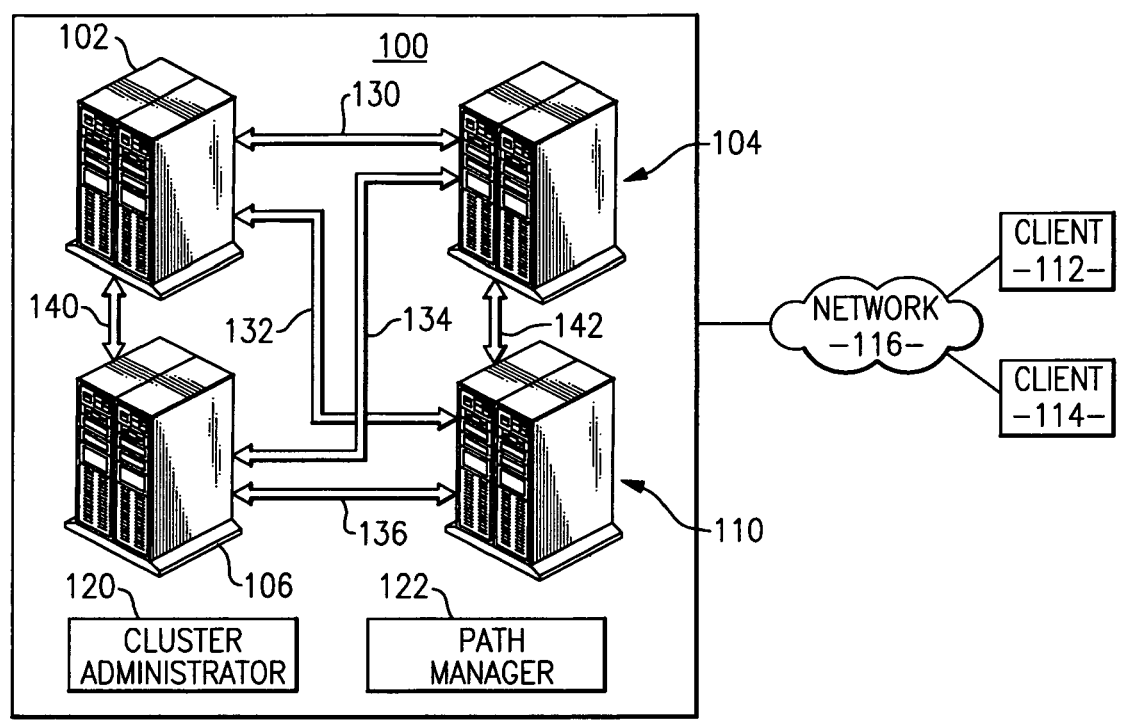
FIG. 1 illustrates a computer cluster.

This invention relates to files registry in multiple computer systems, networks or clusters. The invention may be used with many specific types of computer systems, networks or clusters, and FIG. 1 shows, as an example, one computer cluster with which the invention may be used. In particular, FIG. 1 illustrates a computer cluster 100 comprising a plurality of computer systems or nodes 102, 104, 106, 110, and this cluster is connected to clients 112 and 114 via network 116. FIG. 1 also shows a cluster administrator 120 and a path manager 122.

The computing systems 102, 104, 106, 110 constitute a cluster in which a first computing system may be used as a backup of a second computing system should the second computing system fail. The functions and resources of the failed second computing system may be taken over by the first computing system in a manner generally known in the art.

The computing systems 102, 104, 106; 110 may be any type of computing system that may be arranged in a cluster with other computing systems. For example, the computing systems 102, 104, 106, 110 may be server computers, client computers, and the like. The computing systems **102, 104, 106, 110 may be single processor systems or multiprocessor systems. In short, any type of computing system that may be used in a cluster with other computing systems is intended to be within the spirit and scope of the present invention.

The computing systems 102, 104, 106, 110 are coupled to one another via communication links 130, 132, 134, 136, 140, 142. The communication links 130, 132, 134, 136, 140, 142 may be any type of communication links that provide for the transmission of data between the computing systems 102, 104, 106, 110. For example, the communication links may be wired, wireless, fiber optic links, satellite links, infrared links, data buses, a local area network (LAN), wide area network (WAN), the Internet, or the like. Any type of communication link may be used without departing from the spirit and scope of the present invention.

Cluster administrator 120 is provided to manage computer cluster 100 and, for instance, provides a centralized facility to create, delete and modify user accounts. Path manager 122 is provided to route data between the computer systems of cluster 100. In a preferred embodiment, path manager 122 operates in a distributed fashion through a local component residing within each node in cluster 100. Path manager 122 knows about the interconnection topology of cluster 100 and monitors the status of communication pathways through the cluster. Path manager 122 also provides an interface registry through which other components interested in the status of the interconnect can register. This provides a mechanism for the path manager to make callbacks to the interested components when the status of a path changes, if a new path comes up, or if a path is removed.

Clients 112 and 114 can include any node on network 116 having a computational capability and including a mechanism for communicating across network 116. In one embodiment of the present invention, clients 112 and 114 communicate with cluster 100 by sending packets to the cluster in order to request services from the cluster.

Network 116 can include any type of wire or wireless communication channel capable of coupling together computing nodes. This includes, but is not limited to, a local area network, a wide area network, or a combination of networks. For example, network may be or include the Internet.

Referring to FIG. 2, a block diagram of a data processing system that may be implemented as a computing system in a clustered system, such as clustered system 100 in FIG. 1, is depicted. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 102, 104, 106, 110 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

As mentioned above, user group management operations in operating systems commonly used on multiple computer systems do not allow in a single host the creation and management of plural or alternative user/group data files, commonly referred to as the files registry. The present invention provides a single host with this capability.

Generally, this is done by using user/group management interfaces to support an option that allows the administrator to specify a base directory (path) that tells user/group management operations the starting point for the files registry that is the target of the modifications. This new option is referred to herein as "base directory," i.e., the starting point at which a file's registry will be created, and can be represented as <base_dir>. With this base directory option, a single host can contain plural or multiple sets of files registry data, all created, managed, and maintained from a single point of administration. An administrator can then distribute each files registry set from one host to other hosts in a cluster. Each files registry set can contain data that is largely the same, mostly the same, only somewhat the same, or entirely unique per files registry set. (Including, but not limited to, administrator ids, user ids, service/daemon ids, application ids, one-time use ids, restricted use ids, etc.)

More specifically, in accordance with a preferred embodiment of the invention, a common switch/flag/directive (-b, for example) is established within an existing user/group management commands that instructs the management operation to make modifications to files starting at location <base_dir>, meaning "base directory." Using the AIX mkuser command as an example, the administrator can specify the instruction shown in FIG. 3. In this instruction, −b would tell mkuser to create user testid22 in the file registry that exists under the path /filesregistry/adminhosts/. The user would be created with an id of 9845 and a logintimes value that does not permit access on Sunday between 12:01 AM and 11:59 PM.

The files that would exist under /filesregistry/adminhosts/ would mimic those otherwise stored under /etc/ and /etc/security/. In the case of testid22 in the above example, the files in the /filesregistry/adminhosts/ would include the files shown in FIG. 4 and would resemble the "etc" structure.

Importantly, the invention allows a new "base files registry" directory, where the new base directory can be any point in a file system that is accessible to the administrator. The new base directory is specified by the administrator via <base_dir>. <base_dir> can be any point in an accessible file system (local or remote) to which the administrator has read/write access.

The ability to create, manage, maintain, and distribute from a single host (i.e., a single point of administration) has tremendous value, because it now allows an administrator to conveniently and easily organize and tailor user and group data based on their needs.

It should be understood that the present invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A method of managing multiple files registries in a computer cluster including multiple computer systems, the method comprising the steps of:

creating the multiple files registries, each of the multiple files registries including a plurality of user files associated with a plurality of the multiple computer systems of the computer cluster, and different ones of the multiple files registries being associated with different subsets of the multiple computer systems;

managing all of the multiple files registries from one of the multiple computer systems, said one of the multiple computer systems including an operating system having a user/group management operation, including providing an administrator with access to each of the multiple files registries independent of all of the others of the multiple files registries;

inserting into said user/group management operation a respective one base directory for each of the multiple files registries specifying a path to said each of the multiple files registries;

using said one of the multiple computer systems to create, delete and modify the plurality of user files on the multiple files registries;

providing a path manager to route data between the multiple computer systems of the cluster, wherein the path manager operates through a local component within each node of said cluster;

the administrator making modifications to each of the multiple files registries by sending instructions to the base directory for said each of the multiple files registries in the user/group management operation of said operating system of said one of the computer systems, said instructions specifying the modifications to be made to said each of the multiple file registries; and the administrator distributing the different ones of the multiple files registries from said one of the computer systems to the different subsets of the multiple computer systems;

wherein the multiple computer systems includes a plurality of defined types of computers, and the step of creating the multiple files registries includes the step of creating a respective one files registry for each of said defined types of computers; and wherein the inserting includes inserting a common directive within an existing command of the user/group management operation, and all of the multiple files registries are created and managed from said common directive.

2. The method according to claim 1, wherein:

said defined types of computers includes a set of login nodes, a set of computer nodes and a set of administrator nodes; and the step of creating a respective one files registry for each of said defined types of computers includes the steps of creating a first file registry for said login nodes, a second file registry for said computer nodes, and a third file registry for said administrator nodes.

* * * * *